(12) United States Patent
Ahmed et al.

(10) Patent No.: US 11,838,369 B1
(45) Date of Patent: Dec. 5, 2023

(54) EDCA OPTIMIZATION FOR ARTIFICIAL REALITY LINKS

(71) Applicant: Meta Platforms Technologies, LLC, Menlo Park, CA (US)

(72) Inventors: Nabeel Ahmed, San Jose, CA (US); Sam Padinjaremannil Alex, Dublin, CA (US); William Louis Abbott, Portola Valley, CA (US); Fabrizio Guerrieri, Santa Clara, CA (US); Payam Torab Jahromi, Laguna Niguel, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/739,566

(22) Filed: May 9, 2022

Related U.S. Application Data

(63) Continuation of application No. 16/942,592, filed on Jul. 29, 2020, now Pat. No. 11,330,460.
(Continued)

(51) Int. Cl.
*H04W 52/02* (2009.01)
*H04L 67/131* (2022.01)
(Continued)

(52) U.S. Cl.
CPC ........ *H04L 67/131* (2022.05); *H04L 41/5003* (2013.01); *H04W 28/0215* (2013.01);
(Continued)

(58) Field of Classification Search
CPC ........ G02B 2027/0178; H04N 23/698; H04N 21/234327; H04N 21/816; H04N 21/44218; H04N 21/00; H04N 13/376; H04N 21/21805; H04N 21/4728; H04N 13/38; H04N 21/234345; H04N 13/117; H04N 13/194; H04L 65/80; H04L 67/61; H04L 67/131; H04L 65/765; H04L 65/613; H04L 65/756; H04L 65/612; H04L 65/752; G06T 15/20; G06F 3/011
See application file for complete search history.

(56) References Cited

U.S. PATENT DOCUMENTS

| | | | |
|---|---|---|---|
| 5,867,483 A | 2/1999 | Ennis, Jr. et al. | |
| 7,801,104 B2 | 9/2010 | Gaur | |

(Continued)

FOREIGN PATENT DOCUMENTS

WO 2019143189 A1 7/2019

*Primary Examiner* — Jung Liu
(74) *Attorney, Agent, or Firm* — Foley & Lardner LLP

(57) ABSTRACT

Disclosed herein are related to a system and a method of reducing contention in accessing a wireless link. In one aspect, a first device includes a transceiver configured to communicate with a second device via a wireless link. In one aspect, the first device includes a processor configured to determine that a type of content to be transferred between the first device and the second device through the wireless link. In one aspect, the processor is configured to modify one or more parameters for the first device to access the wireless link, from a first set of values to a second set of values, in response to determining that the type of content is artificial reality. In one aspect, the processor is configured to cause the transceiver to access the wireless link using the second set of values.

20 Claims, 7 Drawing Sheets

Related U.S. Application Data

(60) Provisional application No. 62/926,796, filed on Oct. 28, 2019.

(51) Int. Cl.
  *H04W 74/08* (2009.01)
  *H04L 41/5003* (2022.01)
  *H04W 28/02* (2009.01)
  *H04W 72/0446* (2023.01)
  *H04W 72/51* (2023.01)
  *H04W 72/54* (2023.01)

(52) U.S. Cl.
  CPC ....... *H04W 72/0446* (2013.01); *H04W 72/51* (2023.01); *H04W 72/54* (2023.01); *H04W 74/0816* (2013.01); *H04W 74/0825* (2013.01)

(56) References Cited

U.S. PATENT DOCUMENTS

| | | | |
|---|---|---|---|
| 10,529,140 B1* | 1/2020 | Ravindran | G06F 3/011 |
| 10,885,719 B1* | 1/2021 | Ravindran | A61B 5/4848 |
| 11,024,263 B2* | 6/2021 | Chhipa | G06F 3/012 |
| 11,043,031 B2* | 6/2021 | Barros | G06F 3/011 |
| 11,382,004 B2* | 7/2022 | Sharma | H04W 36/28 |
| 11,462,011 B2* | 10/2022 | Mason | H04N 21/44218 |
| 11,527,065 B2* | 12/2022 | Okamoto | G08B 7/06 |
| 2014/0321423 A1 | 10/2014 | Kalhan | |
| 2016/0345318 A1 | 11/2016 | Bhandaru et al. | |
| 2017/0041929 A1* | 2/2017 | Noh | H04L 5/0053 |
| 2018/0176730 A1* | 6/2018 | Szymczyk | H04W 4/022 |
| 2018/0270175 A1 | 9/2018 | Kim et al. | |
| 2019/0043448 A1 | 2/2019 | Thakur et al. | |
| 2019/0191376 A1* | 6/2019 | Kim | H04W 52/02 |
| 2019/0363843 A1* | 11/2019 | Gordaychik | H04L 1/08 |
| 2020/0100197 A1 | 3/2020 | Pan et al. | |
| 2020/0107060 A1* | 4/2020 | Khan | H04N 21/2662 |
| 2020/0107068 A1* | 4/2020 | Khan | H04M 1/72454 |
| 2020/0202629 A1 | 6/2020 | Sharma et al. | |
| 2021/0076251 A1 | 3/2021 | Ho et al. | |
| 2021/0120507 A1 | 4/2021 | De La Cruz et al. | |
| 2022/0303603 A1* | 9/2022 | Demange | H04N 21/2665 |

* cited by examiner

EDCA OPTIMIZATION FOR ARTIFICIAL REALITY LINKS

CROSS-REFERENCE TO RELATED APPLICATION

This application is a continuation of U.S. patent application Ser. No. 16/942,592 filed on Jul. 29, 2020, which claims priority to U.S. Provisional Patent Application No. 62/926,796, filed Oct. 28, 2019, which are incorporated by reference in their entirety for all purposes.

FIELD OF DISCLOSURE

The present disclosure is generally related to communication for rendering artificial reality, including but not limited to setting or modifying parameters for accessing a shared wireless network for the artificial reality.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space).

In one implementation, an image of a virtual object is generated by a console communicatively coupled to the HWD. In one example, the HWD includes various sensors that detect a location and/or orientation of the HWD, and transmits the detected location and/or orientation of the HWD to the console through a wired connection or a wireless connection. The console can determine a user's view of the space of the artificial reality according to the detected location and/or orientation of the HWD, and generate image data indicating an image of the space of the artificial reality corresponding to the user's view. The console can transmit the image data to the HWD, by which the image of the space of the artificial reality corresponding to the user's view can be presented to the user. In one aspect, the process of detecting the location of the HWD and the gaze direction of the user wearing the HWD, and rendering the image to the user should be performed within a frame time (e.g., less than 11 ms). Any latency between a movement of the user wearing the HWD and an image displayed corresponding to the user movement can cause judder, which may result in motion sickness and can degrade the user experience.

SUMMARY

Various embodiments disclosed herein are related to a first device for accessing a wireless link. In some embodiments, the first device includes a transceiver configured to communicate with a second device via the wireless link. In some embodiments, the one or more processors configured to determine that the wireless link is being accessed by at least a third device during a first time period. In some embodiments, the one or more processors are configured to modify one or more parameters for the first device to access the wireless link, from a first set of values to a second set of values, in response to determining that at least one of i) the wireless link is being accessed during the first time period or ii) a type of content to be transferred between the first device and the second device is artificial reality. In some embodiments, the one or more processors are configured to cause the transceiver to initiate access to the wireless link using the second set of values during a second time period after the first time period.

In some embodiments, the one or more parameters include at least one of arbitration interframe spacing (AIFS), minimum contention window (CWmin), maximum contention window (CWmax), or transmit opportunity (TXOP).

In some embodiments, the one or more processors are further configured to determine a collision in accessing the wireless link during the second time period. In some embodiments, the one or more processors are configured to adjust the second set of values according to a random value to generate a third set of values for the one or more parameters, in response to determining the collision during the second time period. In some embodiments, the one or more processors are configured to cause the transceiver to access the wireless link using the third set of values during a third time period after the second time period. In some embodiments, the one or more processors are further configured to delay a start of the third time period for accessing the wireless link, according to the third set of values.

In some embodiments, the one or more processors are further configured to determine a success in accessing the wireless link during the second time period. In some embodiments, the one or more processors are configured to modify the one or more parameters from the second set of values to a third set of values, in response to the success in accessing the wireless link during the second time period. In some embodiments, the one or more processors are configured to cause the transceiver to access the wireless link using the third set of values during a third time period after the second time period, in response to the success in accessing the wireless link during the second time period.

In some embodiments, the one or more processors are further configured to reduce a size of a channel contention slot, in response to determining that the type of content to be transferred between the first device and the second device through the wireless link is the artificial reality. In some embodiments, the one or more processors are configured to delay a start of the second time period for accessing the wireless link, according to i) the second set of values and ii) the reduced size of the channel contention slot.

In some embodiments, the one or more processors are further configured to modify the one or more parameters from the second set of values to the first set of values, after a predetermined time period from the second time period. In some embodiments, the one or more processors are configured to cause the transceiver to access the wireless link using the first set of values after the predetermined time period from the second time period.

In some embodiments, the one or more processors are further configured to determine an amount of congestion in the wireless link. In some embodiments, the one or more processors are configured to generate the second set of values for the one or more parameters according to the determined amount of congestion in the wireless link. In some embodiments, the one or more processors are further configured to delay a start of the second time period for accessing the wireless link, according to the second set of values.

In some embodiments, the first device includes a first queue associated with a first content for artificial reality and a second queue associated with a second content different from the artificial reality. In some embodiments, the one or more processors are further configured to determine that the second queue has completed a countdown earlier than the first queue. In some embodiments, the one or more processors are configured to cause the transceiver to transmit the first content for a set time period, in response to the second queue completing the countdown earlier than the first queue. In some embodiments, the one or more processors are configured to cause the transceiver to transmit the second content according to the second queue after the set time period. In some embodiments, the one or more processors are further configured to cause the transceiver to release the wireless link for the second content to access the wireless link after the set time period.

In some embodiments, the one or more processors are configured to determine that the wireless link is being accessed by the third device by determining that communication with the second device through the wireless link is unsuccessful or interfered with. In some embodiments, the one or more processors are configured to determine that the wireless link is being accessed by the third device by detecting energy above a threshold. In some embodiments, the one or more processors are configured to determine that the wireless link is being accessed by the third device by, according to a schedule of the third device to access the wireless link.

Various embodiments disclosed herein are related to a method of accessing a wireless link. In some embodiments, the method includes determining, by a first device, that the wireless link for communicating with a second device, is being accessed by at least a third device during a first time period. In some embodiments, the method includes modifying, by the first device, one or more parameters for the first device to access the wireless link, from a first set of values to a second set of values, in response to determining that at least one of i) the wireless link is being accessed during the first time period or ii) a type of content to be transferred between the first device and the second device is artificial reality. In some embodiments, the method includes initiating, by the first device, access to the wireless link using the second set of values during a second time period after the first time period. In some embodiments, the one or more parameters include at least one of arbitration interframe spacing, minimum contention window, maximum contention window, or transmit opportunity.

In some embodiments, the method includes determining, by the first device, a collision in accessing the wireless link during the second time period. In some embodiments, the method includes adjusting, by the first device, the second set of values according to a random value to generate a third set of values for the one or more parameters, in response to determining the collision during the second time period. In some embodiments, the method includes accessing, by the first device, the wireless link using the third set of values during a third time period after the second time period. In some embodiments, the method includes delaying, by the first device, a start of the third time period for accessing the wireless link, according to the third set of values.

In some embodiments, the method includes determining, by the first device, a success in accessing the wireless link during the second time period. In some embodiments, the method includes modifying, by the first device, the one or more parameters from the second set of values to a third set of values, in response to the success in accessing the wireless link during the second time period. In some embodiments, the method includes initiating, by the first device, access to the wireless link using the third set of values during a third time period after the second time period. In some embodiments, the method includes reducing, by the first device, a size of a channel contention slot, in response to determining that the type of content to be transferred between the first device and the second device through the wireless link is the artificial reality. In some embodiments, the method includes delaying, by the first device, a start of the second time period for accessing the wireless link according to the second set of values and the reduced size of the channel contention slot.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The present disclosure relates generally to systems and methods for communication for rendering artificial reality. More particularly, the present disclosure relates to systems and methods for dynamically adjusting one or more parameters (e.g., enhanced distributed channel access (EDCA) parameters) for sharing a wireless link.

Multiple artificial reality devices may use a shared wireless link. To access the shared wireless link, each device may configure or set one or more parameters (e.g., EDCA parameters). Examples of EDCA parameters include arbitration interframe spacing (AIFS), minimum contention window (CWmin), maximum contention window (CWmax), or transmit opportunity (TXOP). To ensure fairness in medium access, multiple wireless devices may probabilistically or randomly set values of EDCA parameters to compete for access to the wireless link. However, accessing the wireless link in a probabilistic manner to promote fairness may cause latency or reduced throughput. Such latency or reduced throughput may not be suitable for latency critical applications such as artificial reality applications.

In one aspect, one or more devices can dynamically set one or more parameters to access a wireless link to prioritize certain content, while also allowing other content to access or share the wireless link. In one approach, a device can deterministically set values of EDCA parameters to prioritize communication for certain content. For example, communication for artificial reality applications can be prioritized over other content. However, in case a collision occurs, if two or more devices adjust parameters in a same manner, then further collisions may occur. In one aspect, in case a collision occurs or a channel congestion is detected, different devices may adjust EDCA parameters according to a random variable such that further collisions can be avoided. In some embodiments, the one or more devices deterministically set values of EDCA parameters for a first time period, then probabilistically set values of the EDCA parameters for a second time period. In some embodiments, the one or more devices may detect a channel condition (e.g., a number of devices accessing the wireless link), and dynamically set EDCA parameters according to the detected channel condition. By dynamically changing EDCA parameters, artificial reality can be remotely provided through a wireless link with reduced latency and high throughput, while allowing other devices to access or share the wireless link.

Figure 1:
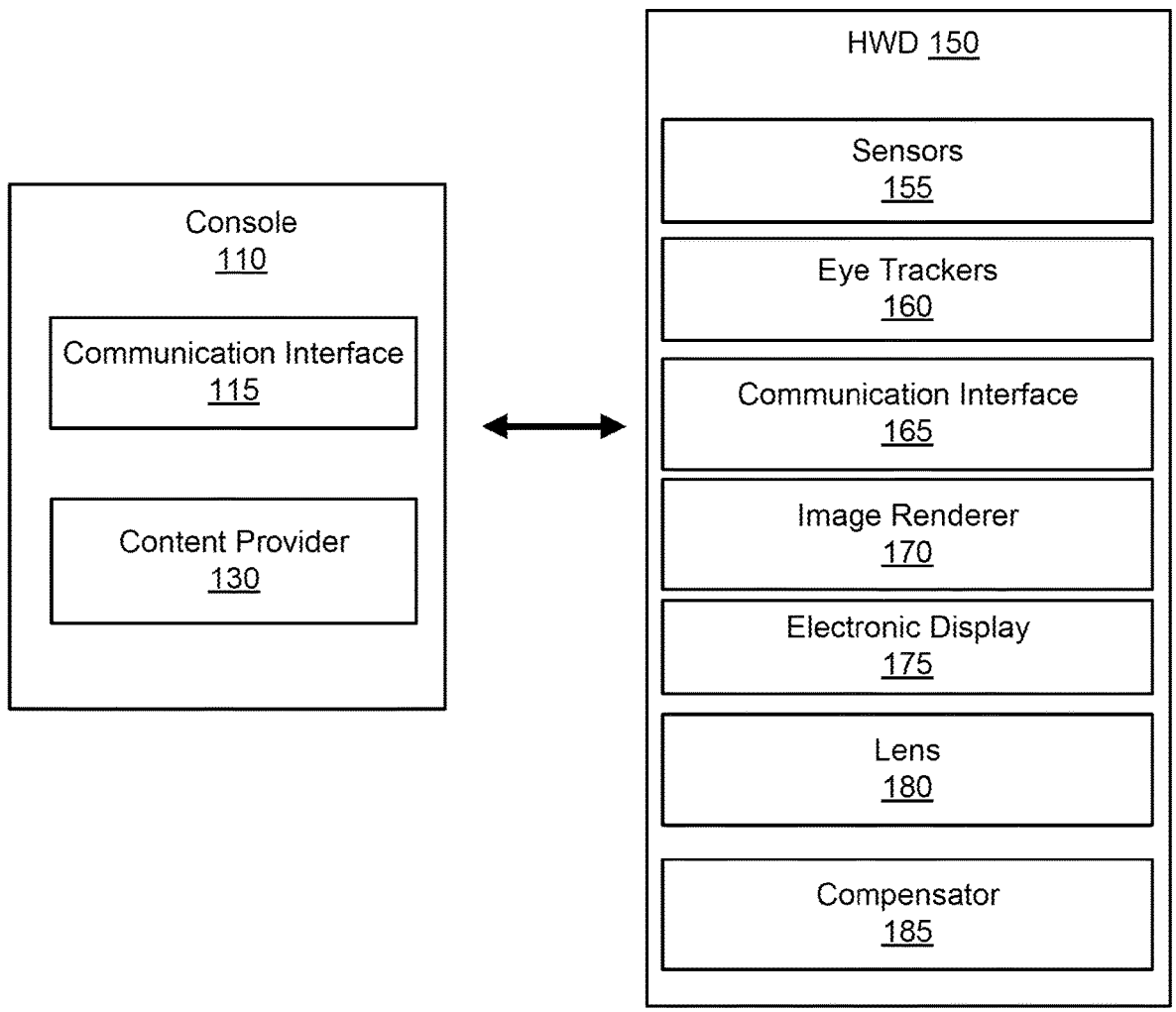
FIG. 1 is a diagram of a system environment including an artificial reality system, according to an example implementation of the present disclosure.

FIG. 1 is a block diagram of an example artificial reality system environment 100. In some embodiments, the artificial reality system environment 100 includes a HWD 150 worn by a user, and a console 110 providing content of artificial reality to the HWD 150. The HWD 150 may be referred to as, include, or be part of a head mounted display (HMD), head mounted device (HMD), head wearable device (HWD), head worn display (HWD) or head worn device (HWD). The HWD 150 may detect its location and/or orientation of the HWD 150 as well as a shape, location, and/or an orientation of the body/hand/face of the user, and provide the detected location/or orientation of the HWD 150 and/or tracking information indicating the shape, location, and/or orientation of the body/hand/face to the console 110. The console 110 may generate image data indicating an image of the artificial reality according to the detected location and/or orientation of the HWD 150, the detected shape, location and/or orientation of the body/hand/face of the user, and/or a user input for the artificial reality, and transmit the image data to the HWD 150 for presentation. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination of them may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gate direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 150 in a physical space into a virtual space (or simultaneous localization and mapping (SLAM) data), eye tracking data, motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 can include or correspond to a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms). In one aspect, the communication interface 115 can adaptively transmit the additional data to the HWD 150 as described below with respect to FIGS. 3 through 6.

Figure 2:
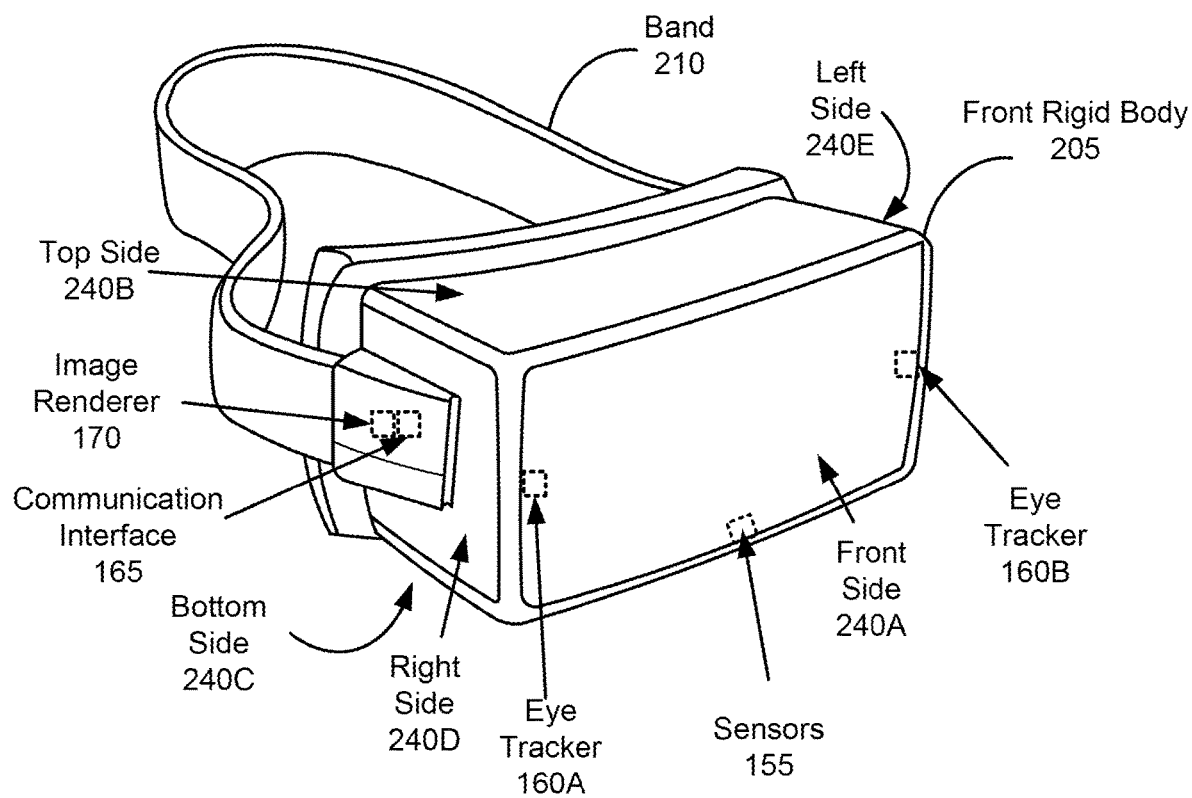
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2.

Figure 3:
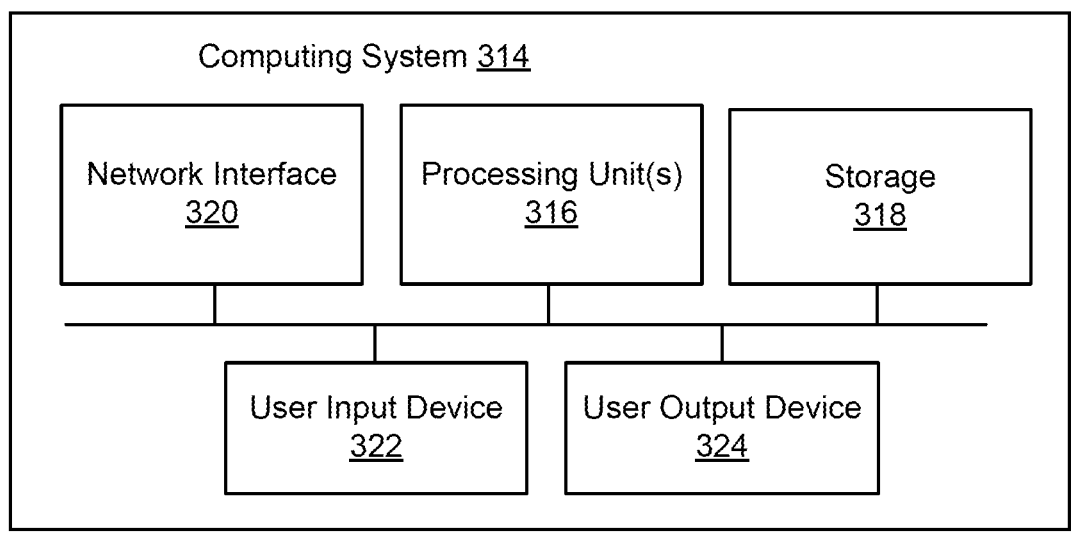
FIG. 3 is a block diagram of a computing environment according to an example implementation of the present disclosure.

FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Various operations described herein can be implemented on computer systems having the configuration that is same as or similar to that of the computing system 314.

Figure 4:
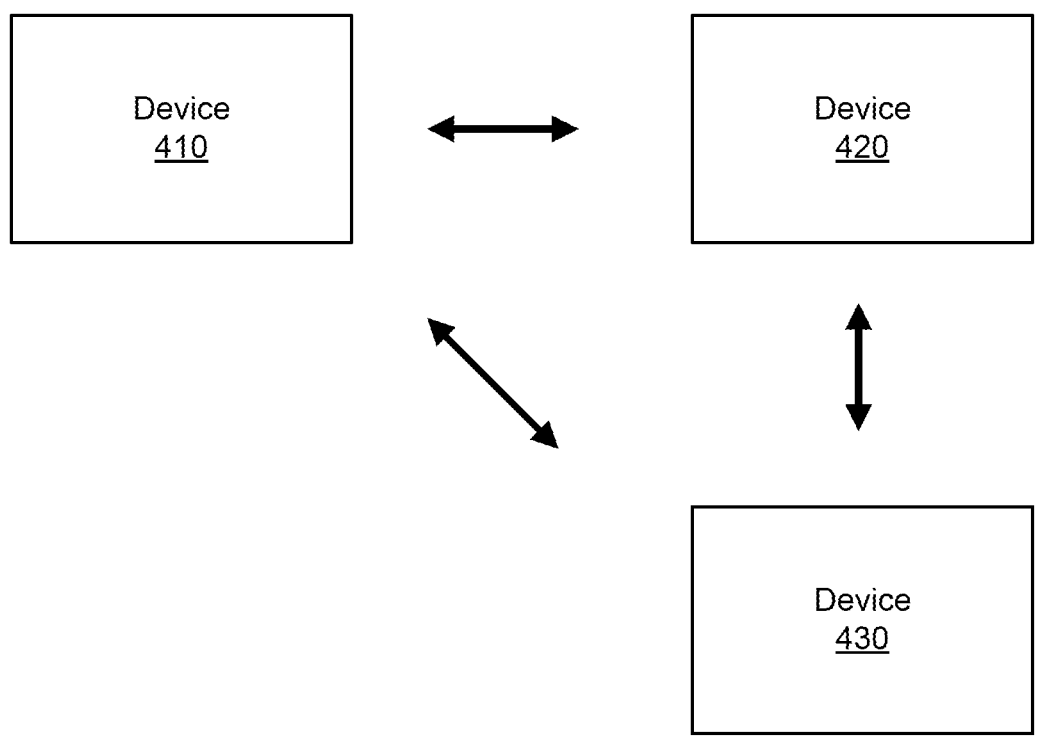
FIG. 4 is a diagram of a system environment including multiple devices sharing a wireless link, according to an example implementation of the present disclosure.

FIG. 4 is a diagram of a system environment 400 including devices 410, 420, 430 sharing a wireless link, according to an example implementation of the present disclosure. In some embodiments, the device 410 may be the console 110 and the devices 420, 430 may be HWDs 150 of FIG. 1. In some embodiments, the device 420 is HWD 150 and the device 430 is another wireless device (e.g., another HWD, smart phone, laptop, computer, tablet PC, or input device such as a controller, pointing device, keyboard, etc.). In some embodiments, the system environment 400 includes more, fewer, or different components than shown in FIG. 4.

In some embodiments, the devices 410, 420, 430 may be located in proximity (e.g., within 100 ft) and may communicate through a wireless link (e.g., Wi-Fi, Bluetooth, etc.). In one aspect, the devices 410, 420, 430, may communicate through the same or overlapping frequency bands, and may compete for access to the wireless link. Each device (e.g., artificial reality device) may generate, set, adjust, modify, or configure its parameters (e.g., EDCA parameters) to attempt to access the wireless link, according to the parameters. Example EDCA parameters include AIFS, CWmin, CWmax, or TXOP.

In one approach, the devices 410, 420, 430 can deterministically set values of EDCA parameters to prioritize communication for certain content. In one example, the device 420 for artificial reality application can be configured to have lower AIFS, CWmin, CWmax values compare to those of the device 430 for another application, such that the device 420 can have a higher priority to access the wireless link than the device 430. Accordingly, artificial reality can be presented to the user with prioritized access to the wireless link.

In one approach, the devices 410, 420, 430 can dynamically set one or more EDCA parameters to access a wireless link to prioritize certain content, while also allowing other content to access or share the wireless link. In one case, the devices 420, 430 may be both for providing artificial reality. The devices 420, 430 may not communicate with each other. In such case, the devices 420, 430 setting values of the EDCA parameters in a deterministic manner may repeatedly cause collisions in accessing the wireless link, because the devices 420, 430 may modify or set to have the same EDCA parameters when failure to access the wireless link is detected. In case a collision occurs, the devices 420, 430 may adjust EDCA parameters according to a random variable. By modifying, adjusting or setting the parameters according to a random variable, repeated collisions can be avoided.

In some embodiments, the device 420 may deterministically set or configure values of EDCA parameters for a first time period, and probabilistically set or configure values of EDCA parameters for a second time period. By setting values of the EDCA parameters deterministically, communication for artificial reality can access the wireless link with a higher priority. Meanwhile, by setting values of the EDCA parameters probabilistically may promote or allow fairness in accessing the wireless link to allow communication for other content with lower priority to access the wireless link. In one approach, the device 420 may periodically change between deterministic EDCA parameters and probabilistic EDCA parameters. In one approach, the device 420 may adaptively detect a channel condition, and change between deterministic EDCA parameters and probabilistic EDCA parameters according to the detected channel condition. For example, the device 420 may sense or detect an end of transmission packet transmitted by another device 430. In response to sensing or detecting the end of transmission packet, the device 420 may set, adjust, or modify EDCA parameters to access the wireless link, after the device 430 releases its access to the wireless link. The device 420 may access the wireless link for the first time period according to the deterministically set EDCA parameters. After the first time period, the device 420 may set or adjust EDCA parameters probabilistically to access the wireless link to allow fairness in accessing the wireless link among different devices.

Figure 5:
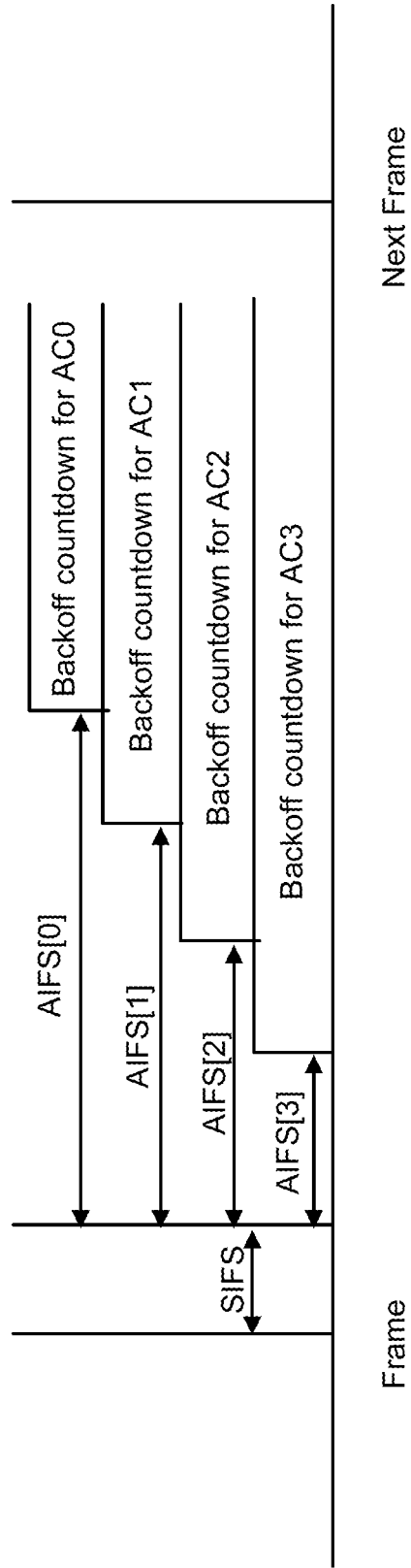
FIG. 5 is a timing diagram showing accessing a wireless link based on EDCA parameters, according to an example implementation of the present disclosure.

FIG. 5 is a timing diagram showing accessing a wireless link based on EDCA parameters, according to an example implementation of the present disclosure. A device (e.g., device 410, 420, 430) may set EDCA parameters, and attempt to access the wireless link according to the EDCA parameters. Examples of EDCA parameters include AIFS, CWmin, CWmax, and TXOP. In one aspect, the AIFS is the time period that the device may wait before invoking a back-off operation or start a countdown. In one aspect, the contention window may be a range for the randomized back-off algorithm to choose a back-off time. The device may set an initial countdown value to be CWmin, and decrease the countdown value for each back-off time slot. When the countdown value reaches '0', the device may initiate or attempt to access the wireless link. In case accessing the wireless link fails, the device may increase or double the initial countdown value. The initial countdown value may be increased up to the CWmax. In one aspect, the TXOP indicates the maximum duration that the device can access the wireless link. By setting or adjusting the EDCA parameters, the device may access the shared wireless link.

In one aspect, EDCA parameters can be determined or assigned according to a priority. In one approach, communication can be classified into access classes (AC) according to a type of content to transmit. For example, communication can be classified into voice, video, best effort, background, etc. In some embodiments, artificial reality application may select an AC or queue. According to the AC, the wireless controller 520 can select a set of values for the EDCA parameters. In one example, a higher priority AC may have a smaller AIFS than a lower priority AC. In one example, a higher priority AC may have a smaller CWmin and CWmax than a lower priority AC. Hence, a higher priority AC may obtain access to the wireless link before the lower priority AC.

Figure 6:
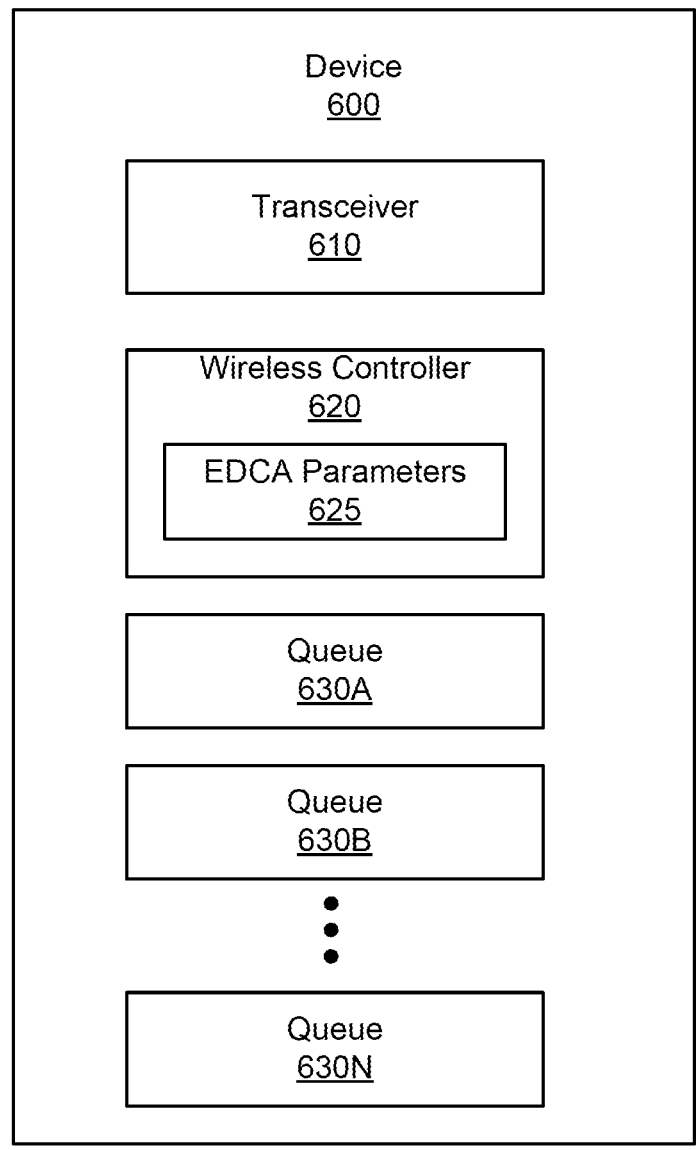
FIG. 6 is a diagram of a device for accessing a wireless link, according to an example implementation of the present disclosure.

FIG. 6 is a diagram of a device 600 for accessing a wireless link, according to an example implementation of the present disclosure. In some embodiments, the device 600 may be the device 410, 420, 430. In some embodiments, the device 600 includes a transceiver 610, a wireless controller 620, and queues 630A, 630B . . . 630N. These components may operate together to access a wireless link shared by other devices. In some embodiments, the device 600 includes more, fewer, or different components than shown in FIG. 6.

In some embodiments, the transceiver 610 includes or corresponds to a component that communicates with a transceiver of another device through a wireless medium (a cellular communication link, a near field communication link, Wi-Fi, Bluetooth, 60 GHz wireless link, or any communication wireless communication link). The transceiver 610 may be embodied as RF circuitry or a combination of RF circuitry and logic circuitry. The transceiver 610 may include a receiver to receive data or sense another device through the wireless medium. The transceiver 610 may also include a transmitter to transmit data through the wireless medium.

In some embodiments, the wireless controller 620 includes or corresponds to a component that configures the transceiver 610 for accessing the wireless link. The wireless controller 620 may be embodied as logic circuitry. In some embodiments, the wireless controller 620 is embodied as one or more processors and a non-transitory computer readable medium storing instructions executable by the one or more processors to perform various functions or operations described herein. In some embodiments, the wireless controller 620 sets and stores a set of values for the EDCA parameters 625. According to the EDCA parameters 625, the wireless controller 620 may configure the transceiver 610 to access the wireless link.

In one approach, the wireless controller 620 can dynamically set one or more EDCA parameters 625 to access a wireless link. In one approach, the wireless controller 620 deterministically sets values of EDCA parameters to prioritize communication for certain content. In one example, the wireless controller 620 can configure the EDCA parameters to have a lower set of values for artificial reality applications than a set of values for other content, such that the transceiver 610 may have a higher chance of accessing the wireless link for the artificial reality applications. In case a collision occurs when attempting to access the wireless link, the wireless controller 620 may adjust EDCA parameters according to a random variable. By modifying, adjusting or setting the parameters according to a random variable, further collisions can be avoided. After successfully accessing the wireless link for a predetermined time period, the wireless controller 620 may reset the EDCA parameters 625 to have a set of default values.

In some embodiments, the wireless controller 620 may deterministically set or configure values of EDCA parameters for a first time period, and probabilistically set or configure values of EDCA parameters for a second time period. In one approach, the wireless controller 620 may periodically change between deterministically set values and probabilistically set values for the EDCA parameters. For example, the wireless controller 620 may periodically change between deterministically set values and probabilistically set values for EDCA parameters every 10 ms or a predetermined number of accesses (e.g., 100) to the wireless link.

In one approach, the wireless controller 620 may adaptively change between deterministically set values and probabilistically set values for EDCA parameters according to a channel condition or an amount of congestion in the wireless link. For example, the wireless controller 620 determines that the wireless link is being accessed by another device, in response to a failure of the transceiver 610 to access the wireless link. For example, the wireless controller 620 determines that the wireless link is being accessed by another device, in response to a signal strength or energy of another device detected by the transceiver 610 exceeding a predetermined threshold (e.g., −80 dBm). For example, the wireless controller 620 receives or obtains a transmission schedule of another device, and determines that the wireless link is allocated to another device, according to the transmission schedule of the other device. In response to determining an amount of congestion in the wireless link (e.g., a number of nearby wireless devices detected) exceeding a predetermined threshold, the wireless controller 620 may set, adjust, or modify values of the EDCA parameters deterministically according to priorities, for example, associated with ACs. In response to determining an amount of congestion in the wireless link not exceeding the predetermine threshold, the wireless controller 620 may set, adjust, or modify values of the EDCA parameters probabilistically.

In some embodiments, the transceiver 610 waits for an end of communication of another device, and the wireless controller 620 applies EDCA parameters to access the wireless link. In one approach, the transceiver 610 monitors or senses an end of transmission packet transmitted by another device. In response to sensing or detecting the end of transmission packet, the wireless controller 620 may set, adjust, or modify EDCA parameters to access the wireless link, after the other device releases its access to the wireless link. In one approach, the wireless controller 620 obtains a transmission schedule of another device, and configures the transceiver 610 to wait for the scheduled communication for the another device to end. After the scheduled communication for the another device ends, the wireless controller 620 may set, adjust, or modify EDCA parameters to access the wireless link.

In some embodiments, the wireless controller 620 configures the transceiver 610 to access the wireless link for a set time period and releases the wireless link after accessing the wireless link for the set time period. In one approach, the set time period may be predetermined. In one approach, the set time period may be dynamically adjusted according to a channel condition (e.g., a number of devices nearby to access the wireless link). For example, the transceiver 610 may detect presence of nearby devices. According to the number of detected devices, the wireless controller 620 may increase or decrease the set time period. After the set time period, the transceiver 610 may release access to the wireless link, regardless of whether the transceiver 610 has completed communication, such that other devices may access the wireless link.

In some embodiments, the wireless controller 620 adaptively sets or adjusts a back-off slot size. A back-off slot size may be a unit time period, based on which the transceiver 610 can perform back-off operation. For example, the wireless controller 620 may count unit time periods to perform back-off operation. In one aspect, the wireless controller 620 may adaptively set the back-off slot size or the unit time period, such that the transceiver 610 may access the wireless link with reduced latency or with a finer resolution. In one approach, the wireless controller 620 applies a smaller back-off slot size for artificial reality applications than a slot size for other content, such that the wireless controller 620 may count down faster and attempt to access the wireless link faster.

In some embodiments, the wireless controller 620 can adaptively set or adjust an amount of back-off or an increase in the initial countdown value, according to the type of content or AC. As described above with respect to FIG. 5, the wireless controller 620 may set an initial countdown value to be CWmin, and decrease the countdown value for each back-off time slot. When the countdown value reaches '0', the wireless controller 620 may configure or cause the transceiver 610 to initiate or attempt to access the wireless link. In case accessing the wireless link fails, the wireless controller 620 may increase the initial countdown value. The increase in the initial countdown value may vary, according to a channel congestion (e.g., channel busy time, or the number of nearby devices discovered). The wireless controller 620 may bound the amount of increase in the back-off time based on the amount of channel congestion observed. For example, the amount of increase in back-off time can be scaled inversely with respect to the amount of time the wireless channel is being used (or the number of detected WiFi devices). By bounding the channel contention time, latency for channel access for artificial reality applications can be reduced.

In some embodiments, the device 600 includes multiple queues 630A, 630B . . . 630N, where each queue 630 may be associated with a corresponding AC or a corresponding type of content to transmit. Each queue may be implemented to perform a countdown for a back-off operation. In one aspect, the wireless controller 620 may resolve contention among different ACs or different queues 630A, 630B . . . 630N. In some cases, a priority inversion may occur, because a lower priority queue or AC may count to '0' before a higher priority queue or AC. In one aspect, the wireless controller 620 may prioritize AC or a queue associated with artificial reality over other ACs or queues. In case the queue or AC with a lower priority counts down to '0' before the queue or AC with a higher priority (for example, associated with the artificial reality application), the wireless controller 620 may configure the transceiver 610 to access the wireless link for the higher priority AC. In case the higher priority AC accesses the wireless link despite the slower countdown (e.g., not counting down to '0' before a lower priority AC counts down to '0'), the wireless controller 620 may assign a set time period for the higher priority AC to access the wireless link. For example, the transceiver 610 may access the wireless link for transmitting artificial reality for the set time period, and release access to the wireless link after the set time period. The transceiver 610 may release the access to the wireless link, regardless of whether the application has completed transmission or not. Accordingly, a queue for a certain type of content (e.g., artificial reality) or a particular AC can be prioritized over other queues or ACs with lower priorities, while other ACs with lower priorities may still have access to the wireless link.

Figure 7:
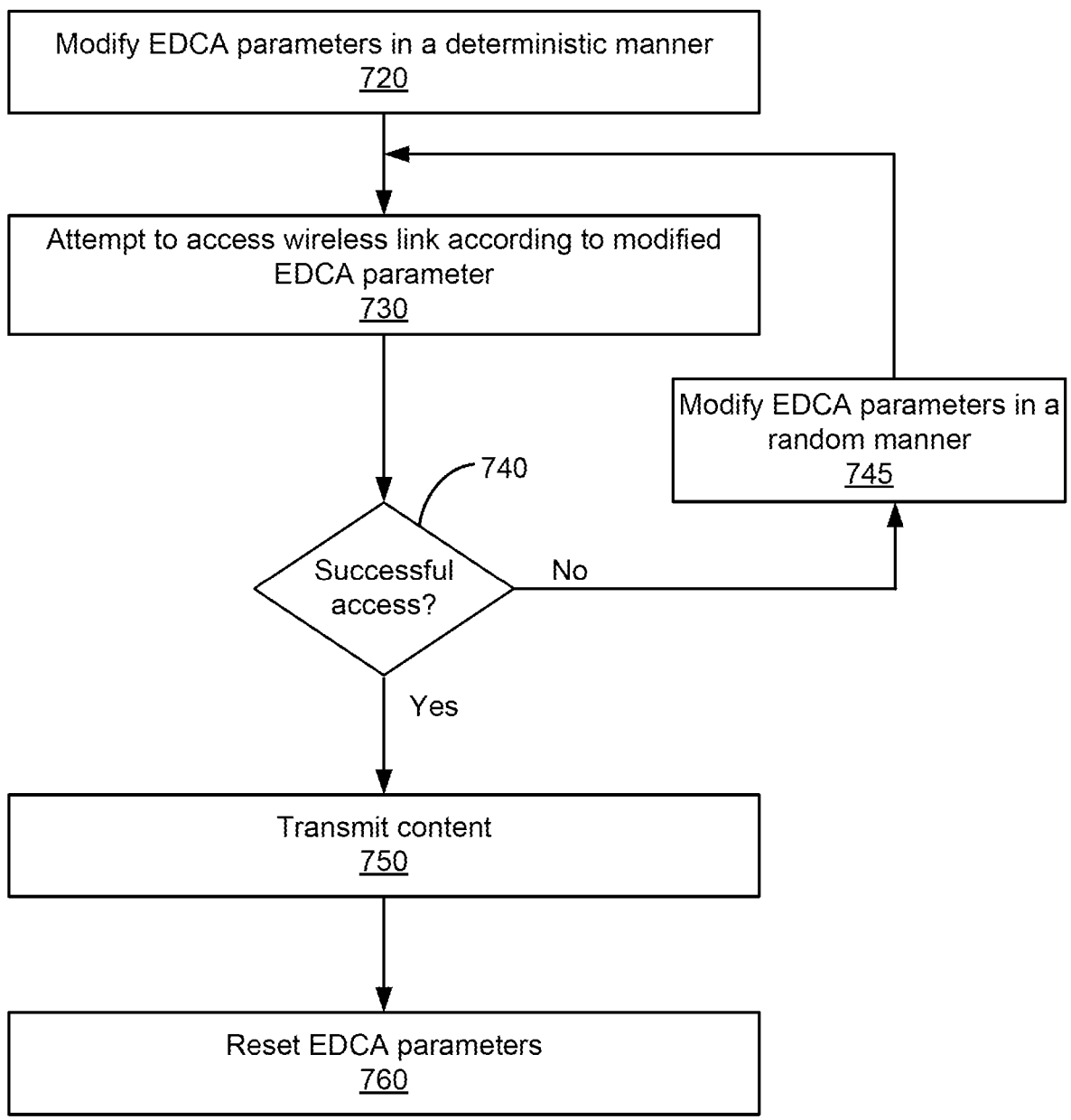
FIG. 7 shows a flow diagram of an example process of adjusting one or more parameters for accessing a wireless link, according to an example implementation of the present disclosure.

FIG. 7 shows a flow diagram of an example process 700 of adjusting one or more parameters for accessing a wireless link, according to an example implementation of the present disclosure. In some embodiments, the process 700 is performed by the device 600 of FIG. 6. In some embodiments, the process 700 is performed by different entities. In some embodiments, the process 700 includes more, fewer, or different steps than shown in FIG. 7.

In one approach, the device 600 modifies 720 values of EDCA parameters in a deterministic manner. The device 600 may modify values of the EDCA parameters in a deterministic manner, according to a type of content to be transmitted. For example, the device 600 may modify values of the EDCA parameters in a deterministic manner to prioritize artificial reality. The device 600 may set or assign a first set of values of EDCA parameters probabilistically, or set or assign a second set of values of EDCA parameters deterministically. By setting the EDCA parameters probabilistically, different devices may share access to the wireless link. Meanwhile, by setting the EDCA parameters deterministically, the device 600 for artificial reality may have a prioritized access to the wireless link. In response to determining that the wireless link is being accessed by another device, the device 600 may modify the EDCA parameters to access the wireless link, from the first set of values to the second set of values, such that the device 600 for artificial reality may have a prioritized access to the wireless link.

In one approach, the device 600 attempts 730 to access the wireless link. The device 600 may attempt to access the wireless link according to the EDCA parameters. In one approach, the device 600 determines 740 whether the access to the wireless link is successful or not. For example, the device 600 determines that the access to the wireless link is successful, in response to receiving a clear-to-send (CTS) frame or acknowledgement frame (ACK) frame during a time period after attempting to access the wireless link. For example, the device 600 determines that the access to the wireless link is unsuccessful, in response to receiving neither the CTS frame nor the ACK frame during the time period after attempting to access the wireless link. In response to determining that the access to the wireless link is unsuccessful, the device 600 may modify 745 EDCA parameters in a random manner, and proceed to the step 730. For example, the device 600 adjusts the second set of values of the EDCA parameters according to a random value to obtain or generate a third set of values. By applying the third set of values obtained according to the random value, further collisions with other devices can be avoided.

In response to determining that the access to the wireless link is successful, the device 600 may transmit 750 content. The device 600 may access the wireless link for a set time period and release the wireless link after accessing the wireless link for the set time period. In one approach, the set time period may be predetermined. In one approach, the set time period may be dynamically adjusted according to a channel condition (e.g., a number of devices nearby to access the wireless link). For example, the device 600 may detect presence of nearby devices. According to the number of detected devices, the device 600 may increase or decrease the set time period. After the set time period, the device 600 may release access to the wireless link, regardless of whether the device 600 has completed communication, such that other devices may access the wireless link.

After successfully accessing the wireless network for a predetermined time period, the device 600 may reset 760 the EDCA parameters 625. In one approach, the device 600 periodically changes between the first set of values, the second set of values, or a different set of values for EDCA parameters 625. For example, the wireless controller 620 may periodically change deterministically set values or probabilistically set values of EDCA parameters every 10 ms or a predetermined number of accesses (e.g., 100) to the wireless link.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A first device comprising:
   a transceiver configured to communicate with a second device via a wireless link; and
   one or more processors configured to:
      determine a type of content to be transferred between the first device and the second device through the wireless link,
      determine a channel condition of the wireless link, and
      generate one or more parameters for the first device to access the wireless link, according to i) the determined channel condition of the wireless link and ii) the type of content to be transferred between the first device and the second device through the wireless link being an artificial reality content.

2. The first device of claim 1, wherein the one or more parameters include at least one of arbitration interframe spacing, minimum contention window, maximum contention window, or transmit opportunity.

3. The first device of claim 1, wherein the one or more processors are configured to:
   determine the channel condition of the wireless link by determining an amount of congestion in the wireless link, and
   generate the one or more parameters to prioritize the artificial reality content, in response to determining that the amount of congestion in the wireless link is below a threshold amount.

4. The first device of claim 3,
   wherein the one or more parameters include at least one of arbitration interframe spacing, minimum contention window, or maximum contention window, and
   wherein the one or more processors are configured to generate the one or more parameters having lower values for the artificial reality content than corresponding values for a different type of content.

5. The first device of claim 1, wherein the one or more processors are configured to:
   determine the channel condition of the wireless link by determining an amount of congestion in the wireless link, and
   generate the one or more parameters probabilistically, in response to determining that the amount of congestion in the wireless link is above a threshold amount.

6. The first device of claim 1, wherein the one or more processors are configured to determine the channel condition by determining whether communication with the second device through the wireless link is unsuccessful or interfered with.

7. The first device of claim 1, wherein the one or more processors are configured to determine the channel condition by determining whether the wireless link is being accessed by a third device, according to the wireless transceiver detecting energy transmitted by the third device.

8. The first device of claim 1, wherein the one or more processors are configured to determine the channel condition by determining whether the wireless link is being accessed by a third device, according to a schedule of the third device to access the wireless link.

9. The first device of claim 1, wherein the one or more processors are configured to modify the one or more parameters after a predetermined time period.

10. The first device of claim 1, wherein the one or more processors are configured to modify the one or more parameters after a predetermined number of times of accessing the wireless link.

11. A method comprising:
    determining, by a first device, a type of content to be transferred between the first device and a second device through a wireless link;
    determining, by the first device, a channel condition of the wireless link; and
    generating, by the first device, one or more parameters for the first device to access the wireless link, according to i) the determined channel condition of the wireless link and ii) the type of content to be transferred between the first device and the second device through the wireless link being an artificial reality content.

12. The method of claim 11, wherein the one or more parameters include at least one of arbitration interframe spacing, minimum contention window, maximum contention window, or transmit opportunity.

13. The method of claim 11,
    wherein determining the channel condition of the wireless link includes determining an amount of congestion in the wireless link, and
    wherein the first device generates the one or more parameters to prioritize the artificial reality content, in response to determining that the amount of congestion in the wireless link is below a threshold amount.

14. The method of claim 13,
wherein the one or more parameters include at least one of arbitration interframe spacing, minimum contention window, or maximum contention window, and
wherein the first device generates the one or more parameters having lower values for the artificial reality content than corresponding values for a different type of content.

15. The method of claim 11,
wherein determining the channel condition of the wireless link includes determining an amount of congestion in the wireless link, and
wherein the first device generates the one or more parameters probabilistically, in response to determining that the amount of congestion in the wireless link is above a threshold amount.

16. The method of claim 11, wherein the first device determines the channel condition by determining whether communication with the second device through the wireless link is unsuccessful or interfered with.

17. The method of claim 11, wherein the first device determines the channel condition by determining whether the wireless link is being accessed by a third device, according to the first device detecting energy transmitted by the third device.

18. The method of claim 11, wherein the first device determines the channel condition by determining whether the wireless link is being accessed by a third device, according to a schedule of the third device to access the wireless link.

19. A first device comprising:
a transceiver configured to communicate with a second device via a wireless link; and
one or more processors configured to:
determine a type of content to be transferred between the first device and the second device through the wireless link is an artificial reality content,
reduce a size of a channel contention slot, in response to determining that the type of content to be transferred between the first device and the second device through the wireless link is the artificial reality content, and
delay a start of a time period for accessing the wireless link, according to the reduced size of the channel contention slot.

20. The first device of claim 19, wherein the one or more processors are further configured to:
determine a collision in accessing the wireless link, and
reduce the size of the channel contention slot, in response to determining the collision.

* * * * *